(12) United States Patent
Thein et al.

(10) Patent No.: US 12,335,749 B2
(45) Date of Patent: Jun. 17, 2025

(54) RELAYING COMMUNICATIONS BETWEEN RADIO NODES

(71) Applicant: Robert Bosch GmbH, Stuttgart (DE)

(72) Inventors: Christoph Thein, Hildesheim (DE); Frank Hofmann, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 271 days.

(21) Appl. No.: 17/895,554

(22) Filed: Aug. 25, 2022

(65) Prior Publication Data

US 2023/0091438 A1 Mar. 23, 2023

(30) Foreign Application Priority Data

Sep. 15, 2021 (EP) ..................................... 21196782

(51) Int. Cl.
*H04W 16/26* (2009.01)

(52) U.S. Cl.
CPC .................................. *H04W 16/26* (2013.01)

(58) Field of Classification Search
CPC .............. H04W 16/26; H04B 7/15528; H04B 7/15514
See application file for complete search history.

(56) References Cited

U.S. PATENT DOCUMENTS

| | | | | |
|---|---|---|---|---|
| 2010/0008247 A1* | 1/2010 | Kwon | ..................... | H04L 43/16 370/252 |
| 2013/0181848 A1* | 7/2013 | Picard | ..................... | H04B 7/15 340/870.03 |
| 2015/0181500 A1* | 6/2015 | Mainaud | ................. | H04L 43/08 370/252 |
| 2019/0132709 A1* | 5/2019 | Graefe | ................... | G05D 1/028 |
| 2019/0274017 A1* | 9/2019 | Wang | .................. | H04L 12/1854 |
| 2020/0322839 A1* | 10/2020 | Nguyen | ................ | H04W 28/04 |

* cited by examiner

*Primary Examiner* — Yuwen Pan
*Assistant Examiner* — Swati Jain
(74) *Attorney, Agent, or Firm* — NORTON ROSE FULBRIGHT US LLP

(57) ABSTRACT

An apparatus configured to generate a relay transmission to a second radio node based on observing a transmission attempt from a first radio node. The apparatus includes a radio interface configured to receive data comprising radio channel observations of the environment and to generate data comprising radio transmissions for transmission into the environment, a monitoring interface configured to receive data characterising the physical state of the environment, and a processor communicatively coupled to the radio interface and the monitoring interface. The processor is configured to: update a model characterising the environment occupied by the first radio node and the second radio node; observe an indication of an attempt of the first radio node to communicate with the second radio node; initiate the relaying of the attempt of the first radio node to communicate with the second radio node.

15 Claims, 6 Drawing Sheets

|   | A | B | C | D |
|---|---|---|---|---|
| A | × | 1.5 | 1 | 1 |
| B | 1.5 | × | 2 | 6 |
| C | 1 | 2 | × | 0.5 |
| D | 1 | 6 | 0.5 | × |

| | A | B | C | D |
|---|---|---|---|---|
| A | × | 30 | 1 | 14 |
| B | 30 | × | 25 | 6 |
| C | 1 | 25 | × | 1 |
| D | 14 | 6 | 1 | × |

RELAYING COMMUNICATIONS BETWEEN RADIO NODES

CROSS REFERENCE

The present application claims the benefit under 35 U.S.C. § 119 of European Patent Application No. EP 21 19 6782.3 filed on Sep. 15, 2021, which is expressly incorporated herein by reference in its entirety.

FIELD

The present application relates to an apparatus for generating a relay transmission to a second radio node based on observing a transmission attempt from a first radio node in an environment, and an associated computer-implemented method, system, computer program product, and computer readable medium.

BACKGROUND INFORMATION

Wireless relaying is a form of cooperative communication in wireless communication networks. A relay node is a stand-alone wireless node configured to forward data from a source node to a destination node. Sometimes, a relay node may be a conventional wireless node in a wireless communication network, where the conventional wireless node has been designated to act as a relay node in certain circumstances. The function of the relay node is, typically, to provide a further wireless communication path between the source node and the destination node. In the presence of wireless channel phenomena such as fading, relaying provides more statistically independent paths between a source node and a destination node. Link reliability and network capacity is enhanced. The improvement can be characterised, for example using the concept of diversity gain, or diversity order.

As an example, a distributed election protocol can be applied to define when a particular relay node should forward data to further nodes. A distributed election protocol is based solely on information from the wireless network itself, such as channel state indication (CSI) information or other wireless channel figures of merit detected by wireless nodes.

Wireless relaying may be further improved.

SUMMARY

According to a first aspect of the present invention, there is provided an apparatus configured to generate a relay transmission to a second radio node based on observing a transmission attempt from a first radio node in an environment. According to an example embodiment of the present invention, the apparatus comprises a radio interface configured to receive data comprising radio channel observations of the environment and to generate data comprising radio transmissions for transmission into the environment, a monitoring interface configured to receive data characterising the physical state of the environment, and a processor communicatively coupled to the radio interface and the monitoring interface. The processor is configured to update a model characterising the environment occupied by the first radio node and the second radio node based, at least partially, on data received via the monitoring interface. The processor is configured to observe, via the radio interface, an indication of an attempt of the first radio node to communicate with the second radio node. The processor is configured to at least initiate the relaying, via the radio interface, of the attempt of the first radio node to communicate with the second radio node, wherein the attempt is relayed to the second radio node if a relay condition derived based on the model indicates that a relay attempt between the first radio node and the second radio node is permitted.

An effect is that the reception probability of messages between users of a wireless system is improved, while at the same time, congestion of the wireless channel remains low. Relaying of messages originally transmitted by a first node to a second node is attempted, if the relay node determines that a direct transmission from the first node to the second node would have a low probability of correct reception at the second node, for example. Furthermore, the relaying arrangement may adapt quickly to physical changes in a channel. Another benefit is that an assessment of channel quality between a plurality of nodes (or locations in an environment) is possible without requiring direct feedback from the radio front end of a radio node, for example. Therefore, a figure of merit of a wireless channel can be inferred in terms of a predicted future position of a wireless node in the environment, rather than being restricted to channel condition feedback from a present position of a wireless node.

According to a second aspect of the present invention, there is provided a computer implemented method for generating a relay transmission to a second node based on observing a transmission attempt from a first radio node in an environment. According to an example embodiment of the present invention, the method comprises:

observing, via a radio interface, an attempt by the first radio node to communicate with the second radio node;
observing the environment, via a monitoring interface configured to receive data characterising the physical state of the environment;
updating, using a processor, a model characterising the environment comprising the first radio node and the second radio node; and
initiating, via the radio interface, a relay of the attempt by the first radio node to communicate with the second radio node, wherein the attempt is relayed to the second radio node if a figure of merit derived based on the model indicates that a relay attempt between the first radio node and the second radio node is permitted.

According to a third aspect of the present invention, a system for assisted radio message relaying is provided. According to an example embodiment of the present invention, the system comprises:

an apparatus according to the first aspect, or its embodiments, a radio communicatively coupled with the radio interface of the apparatus, and configured to receive and/or transmit to the first and second radio nodes, an environment sensor configured to obtain monitoring data of a physical state of an environment, a data communications network configured to communicatively couple the apparatus, the radio, and the environment sensor, and at least first and second radio nodes comprised within an environment observed by the environment sensor. The environment sensor is configured to observe the environment comprising at least the first radio node and the second radio node, and to transmit data characterising the physical state of the environment and/or the locations of the at least first and second radio nodes to the processor.

According to a fourth aspect of the present invention, there is provided a computer program product comprising instructions which, when the program is executed by a processor, cause the processor to carry out the method of the second aspect.

According to a fifth aspect of the present invention, there is provided a computer readable medium comprising instructions which, when executed by a processor, cause the processor to carry out the method of the second aspect.

As an example, in a vehicular communication scenario such as V2X, the relaying of all messages by other users of a wireless network, such as roadside units (RSUs), congests the wireless channel, limits the number of users in a network, and decreases the quality of service. Selective relaying of messages to reach a specific user, user group or area of a wireless network when needed, to achieve reliable operation, is hard to achieve for broadcast messages (for example), with no feedback from a receive node.

The present invention provides using external sensors to obtain an understanding of a physical environment in a which a wireless communication system operates. With this understanding, a prediction of the quality of service of the wireless link between a transmit and receive node can be made. For example, the prediction can be obtained using online ray-tracing, or scenario dependent modelling learned from a large data set using machine learning. The environment (or scene) understanding can be used to make a decision, at a wireless relay node, as to whether, or not, to relay a specific message to a certain area or user, to enable the reception of the message.

BRIEF DESCRIPTION OF THE DRAWINGS

Exemplary embodiments of the present invention are depicted in the figures, which are not to be construed as limiting the present invention, and are explained in greater detail below. Where possible, like reference numerals denote analogous or like features in different figures.

DETAILED DESCRIPTION OF EXAMPLE EMBODIMENTS

Figure 1:
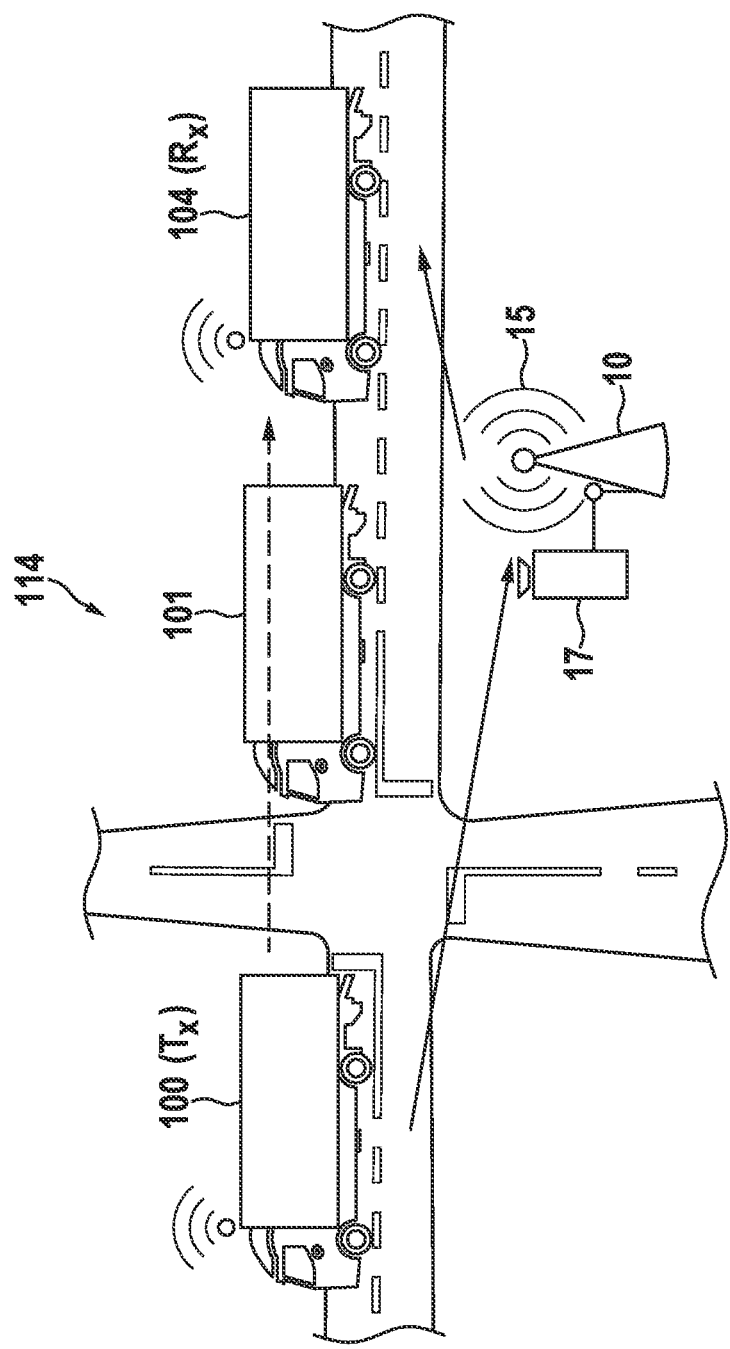
FIG. 1 schematically illustrates an apparatus according to an example of the first aspect of the present invention, in use.

FIG. 1 schematically illustrates an apparatus according to an example of the first aspect, in use. FIG. 1 illustrates a physical state of an environment 114 comprising three vehicles travelling in a straight line over a road intersection. A first vehicle comprising a first radio node 100 is attempting to transmit a radio message to a second vehicle comprising a second radio node 104. A further vehicle acting as an obstacle (radio signal blocker) to radio transmission 101 between the first radio node 100 and the second radio node 104 is located in between the first vehicle and the second vehicle. The vehicles are travelling across a substantially flat environment. In the example of FIG. 1, it may be assumed that multipath fading effects are minimal, and that a figure of merit such as signal-to-noise ratio between the first radio node 100 and second radio node 104 is dominated by a line of sight signal component (LOS). The presence of the further vehicle acting as an obstacle 101 to radio transmission causes an interruption in the line of sight signal component between the first radio node 100 and second radio node 104. It is not essential that the radio nodes 100, 104 are comprised within, or on, vehicles. The radio nodes may be cellular handsets, roadside units (RSUs) as employed in V2X systems, wireless security camera systems, wireless picocell, femtocell, or macrocells. In the sense of 3GPP 5G NR (new radio), the radio nodes may be a "Wide Area Base Station", a "Medium Range Base Station", or a "Local Area Base Station".

The interruption in the line of sight signal component between the first radio node 100 and second radio node 104 would be implied, for example, by examining a figure of merit characterising the wireless environment such as PHY layer metrics such as Received Signal Strength Indication (RSSI) or more complicated channel state information (CSI) computed by the first and/or second radio nodes. However, such an approach has no predictive potential. It is necessary for a relay using RSSI detected at the second radio node as a figure of merit, to wait until a drop in RSSI is detected by the second radio node 104. By this time, corruption of transmissions and a reduction in communication quality between the first radio node 100 and the second radio node 104 would already be present.

The present specification proposes an apparatus 10 configured to decide whether or not to generate a relay transmission to the second radio node 104 by observing the physical state of the environment 114 containing the first and second radio nodes. In an example, the apparatus 10 may be provided with an environment sensor 17 and a radio modem 15. The environment sensor 17 may, for example, be a camera having a field of view over substantially the entire relevant physical state of the environment 114. The apparatus 10 may process image data from an environment sensor 17 (such as a video camera) to recognise a condition in which wireless communication between the first radio node 100 and the second radio node 104 is interrupted, or reduced in quality. It is not essential that the apparatus 10 explicitly recognises an obstacle 101 in the physical environment 114. In some embodiments, the environment sensor 17 may be used to characterise the wireless channel according to a channel model, as will be discussed further. A radio modem 15 may receive a transmission from the first radio 100, and transmit a relay transmission to the second radio node 104 based on the transmission received from the first radio 100, according to a condition derived by the apparatus 10 following analysis of the physical state of the environment 114 using the environment sensor 17.

According to a first aspect, there is provided an apparatus 10 configured to generate a relay transmission to a second radio node 104 based on observing a transmission attempt from a first radio node 100 in a physical environment 114.

The apparatus comprises a radio interface 12 configured to receive data comprising radio channel observations of the environment and to generate data comprising radio transmissions for transmission into the environment, a monitoring interface 14 configured to receive data characterising the physical state of the environment, a processor 16 communicatively coupled to the radio interface 12 and the monitoring interface.

The processor 16 is configured to update a model characterising the environment occupied by the first radio node 100 and the second radio node 104 based, at least partially, on data received via the monitoring interface.

The processor 16 is configured to observe, via the radio interface 12, an indication of an attempt of the first radio node 100 to communicate with the second radio node 104.

The processor 16 is configured to at least initiate the relaying, via the radio interface 12, of the attempt of the first radio node 100 to communicate with the second radio node 104, wherein the attempt is relayed to the second radio node 104 if a relay condition derived based on the model indicates that a relay attempt between the first radio node 100 and the second radio node 104 is permitted.

In this specification, the term "physical state of the environment" relates to parameters that affect the radio channel figure of merit between at least the first radio node 100 and the second radio node 200 in the area of the environment in which these nodes are operating. The term "physical state of the environment" may refer to a 3D function defining the presence of radio frequency blocking or reflecting materials. In an urban environment, the physical state of the environment may be affected by the disposition of buildings in an environment, their height, shape, density, and construction materials, and their relation to a street boundary, and the general disposition of the buildings or other RF signal reflectors (for example, the presence of urban canyons). The response of an RF signal to the physical state of the environment may be affected by the presence, and shape, of trees and shrubs, and in particular bodies of water. The physical state of the environment may be affected by the weather, for example rainfall, the presence of layers of water on buildings, which may cause different propagation characteristics to those experienced in sunny weather. The physical state of the environment may be defined by the general traffic density, and as such, the time of day at which a sample of the physical state of the environment is obtained. Furthermore, the presence of individual vehicles having awkward or blocking shapes in proximity to a first and second radio node may affect the physical state of the environment. A skilled person will appreciate that many other parameters and factors of the physical state of the environment in the sense of affecting the radio channel figure of merit between radio nodes, without loss of generality. It is not essential that the "physical state of the environment" is defined by a 3D function. For example, a 2D image of a road intersection may permit geometrical analysis or other inference concerning whether, or not, radio communication between two radio nodes will be affected by a blocker.

In this specification, the term "generate data comprising radio transmissions for transmission into the environment" may, in one case, refer to the generation of digital baseband data by the processor in the apparatus, and its transfer out of the apparatus via the radio interface. The digital baseband data may be upconverted and broadcast into the radio channel by a remote base station, or a remote radio head, that is not part of the apparatus. In this case, the "radio interface" is capable of communicating digital baseband data, for example, in CPRI format ("Common Public Radio Interface") format. In another case, the apparatus itself may comprise hardware for upconverting a digital baseband signal generated by the processor. In this latter case, the "radio interface" may be considered to comprise up conversion circuitry for upconverting the digital baseband signal, and an antenna capable of transmitting into the channel. Analogously, the "radio interface" of the apparatus may observe the radio channel by receiving RF signals from an integrated antenna, and downconvert them into digital baseband. Alternatively, the "radio interface" of the apparatus may receive digital baseband from remote radio head or base station.

Figure 2:
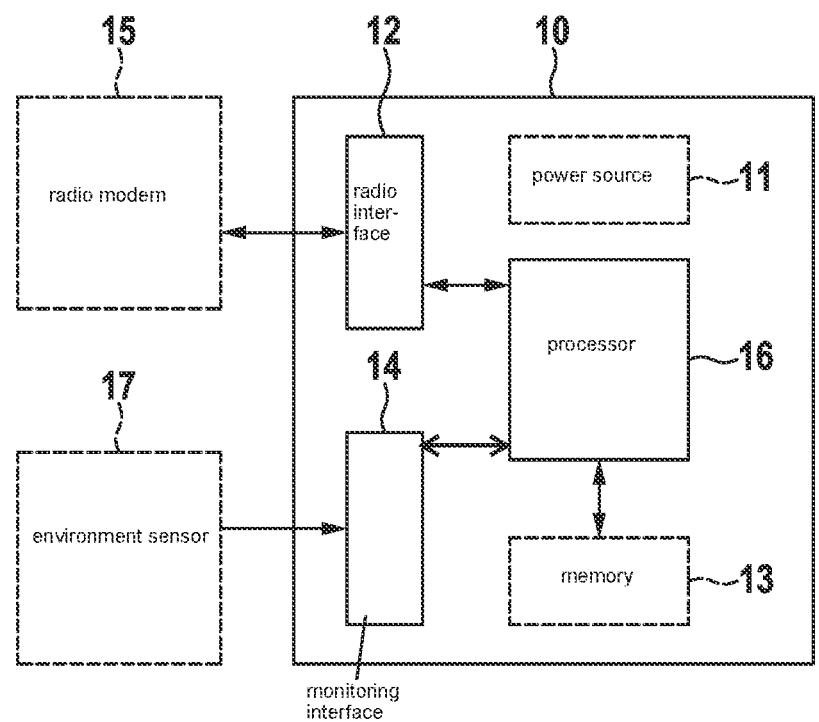
FIG. 2 schematically illustrates a relay node according to a first aspect of the present invention.

FIG. 2 schematically illustrates a relay node 10 according to a first aspect.

The function of the monitoring interface 14 is to receive signals defining or characterising the physical state of the environment. Signals may be obtained from external environment sensor 17 capable of tracking changes in one or more of the qualities of the physical state of the environment relevant to the radio channel figure of merit between radio nodes. According to an embodiment, the environment sensor 17 is selected from the group of at least one of a video camera, an infra-red camera, a 3D depth camera, a stereoscopic camera, or a LIDAR. According to an embodiment, the environment sensor 17 is integrated into the apparatus. According to an embodiment, the environment sensor 17 may obtain information characterising the physical state of the environment via a private or public data communications network from remote sources such as a security camera system, road traffic information system, a weather information source, and the like.

For example, using a video camera as environment sensor 17 permits a wide field of view across a road junction (for example) to be captured in near-real time. With appropriate image processing, the signal from a video camera can capture the arrangement of buildings, trees, and roads relevant to calculating or approximating radio propagation characteristics implied by a physical state of the environment 114. For example, the video camera may be a stereoscopic camera permitting 3D depth estimation of features (such as RF reflecting walls or RF absorbing trees). By applying relevant image recognition algorithms, the signal from a video camera enables the identification of items in video camera's field of view that are expected to contain a radio transmitter. For example, image recognition may enable identification of specific models of car or heavy goods vehicle. Image recognition may enable identification of roadside units (RSUs).

In the example of FIG. 1, the environment sensor 17 is a camera with a field of view capturing locations of the first 100 and second 104 radio nodes and the vehicle 101 acting as an obstacle to radio signal propagation between the first 100 and second 104 radio nodes. With appropriate image processing, a determination may be made that a line of sight RF path does not exist between the first 100 and second 104 radio nodes when the obstructing vehicle 101 is in the illustrated position. Therefore, an example of deriving a relay condition indicating that a relay transmission from radio modem 15 to the second radio node 104 is image processing identifying the presence of the obstructing vehicle 101 is in the illustrated position, and the associated declaration of a binary flag stating that relaying from the relay apparatus 10 to the second radio node 104 is permitted as a result.

In this example, there is no explicit computation of radio channel characteristics or a radio channel figure of merit between the locations of the first and second radio nodes. In this case, the visual identification of the obstructing vehicle 101 using image processing is an implicit indication that the relay condition is met, and the model is, for example, a geometric line model extracted from visual data from the features captured by the environment sensor 17. Obstruction of a geometric feature like a line between radio nodes 100 and 104 in FIG. 1 by an obstruction 101 may be a good approximation of a condition permitting retransmission of communications, in one example, and this condition may be computed efficiently.

Although this specification refers to identifying the locations of radio nodes, the term "location" may also be considered as an "area" or "sector" of the environment, to allow for less accurate sensing modalities. In this case, channel figures of merit may be computed between given areas, rather than locations, in the scenario model.

According to an embodiment, the processor 16 is configured to detect at least one obstacle in-between the area occupied by the first radio node 100 and the area occupied by the second radio node 104 in the physical environment 114. The processor 16 is configured to declare the relay condition that the relay attempt between the first radio node 100 and the second radio node 104 is permitted, if the at least one obstacle is determined by the processor 16 to degrade the radio communication figure of merit of a radio channel between the first radio node 100 and the second radio node 104 by a significant amount.

In the example, the environment sensor 17 is calibrated at its position of operation. For example, the environment sensor 17 may be pre-programmed with a GPS-derived coordinate of its exact installation position. In an embodiment, landmarks visible in the field of view of the environment sensor can be hard-coded or pre-programmed based on the calibration. This enables the relay apparatus 10 to compute relative distances between the location of the environment sensor 17 and a vehicle or roadside unit transmitting CAM messages comprising the coordinates of the respective vehicles or roadside units, for example.

A skilled person will appreciate that the environment sensor 17, and the associated data characterising the physical state of the environment transmitted to the monitoring interface 14 may be one or more of a wide range of items of equipment or data sources enabling calculation or inference of the condition of the figure of merit of a radio channel between at least the first and second radio nodes permitting determination of the relay condition indicating that a relay attempt is permitted. For example, the data characterising the physical state of the environment may be image data captured by a camera, video data captured by a video camera, and/or depth map data captured by a depth camera. The data characterising the physical state of the environment may optionally be, or additionally comprise, data from an external data source such as data characterising the local weather, the local traffic, and/or the time of day characterising the environment.

According to an embodiment, the apparatus further comprises a radio modem 15 communicatively coupled to the radio interface 12, and configured to receive and/or transmit data via the radio channel to the first and second radio nodes 104.

The environment sensor 17 is communicatively coupled to the monitoring interface 14, and is configured to observe the environment comprising at least the first radio node 100 and the second radio node 104, and to transmit data characterising the physical state of the environment to the processor 16.

The function of the radio interface 12 is to receive signals from a radio modem 15 indicating whether the first node 100 has attempted to transmit. The signals may, for example, be received from user equipment (UE) or a gNB. The signals may be relevant across, or obtained from, one or more layers of a protocol stack in the Control Plane and/or the User Plane. The signals may be physical layer signals (transport channels), or digital baseband signals provided by a 3GPP radio head or base band unit. The signal may, for example, be MAC layer signals (logical channels), RLC layer signals (RLC channels), PDCP layer signals (radio bearers), or SDAP layer signals (Qos flows), in the case of a 5G system. The radio interface 12 of the relay apparatus 10 may operate with other protocols such as V2X, or IEEE 802.11p (IEEE 1609 WAVE), for example.

The radio interface 12 may, thus, handle radio communications from one or more radio systems at different frequencies, such as cellular frequencies (around 900 MHZ), Wi-Fi frequencies (around 2.4 or 5 GHz), or millimetre wave frequencies (such as 57-64 GHz) dependent on the configurations and characteristics of the radio modem 15 communicatively connected to the radio interface 12.

A transmit attempt from a first radio node 100 may be denoted by detecting the initiation of activity in a transport or PHY channel, although more complex monitoring of MAC layer timers and higher level protocols can also be used to detect a transmission attempt from the first radio node 100. In an example, location information of the first and/or second radio nodes may be extracted from the signals. For example, the second node 104 may be a roadside unit RSU having a known fixed location that is broadcast in a configuration field of every communication (as with CAM messages).

The apparatus 10 comprises a processor 16 configured to receive signals from the monitoring interface 40 and the radio interface 12. In an example, the processor is an ARM (TM) embedded processor capable of performing computer vision functions such as decoding and filtering signals from the monitoring interface 14, analysing radio data obtained by the radio interface 12, and the like. The apparatus 10 comprises a power source 11 the apparatus 10 comprises a volatile and/or non-volatile memory 13. The apparatus 10 may be configured to receive management information via a data communications network logically separate to that of data communications network subject to the relay function of the apparatus 10.

The processor 16 of the apparatus 10 may execute a decision making engine capable of deciding when to enable the apparatus to relay a wireless communication attempt between first and second nodes. For example, the decision engine may use the model to obtain a channel metric between locations of the first and second nodes, and enable retransmission when the channel metric is too low, or within a hysteresis range.

Figures 3A, 3B:
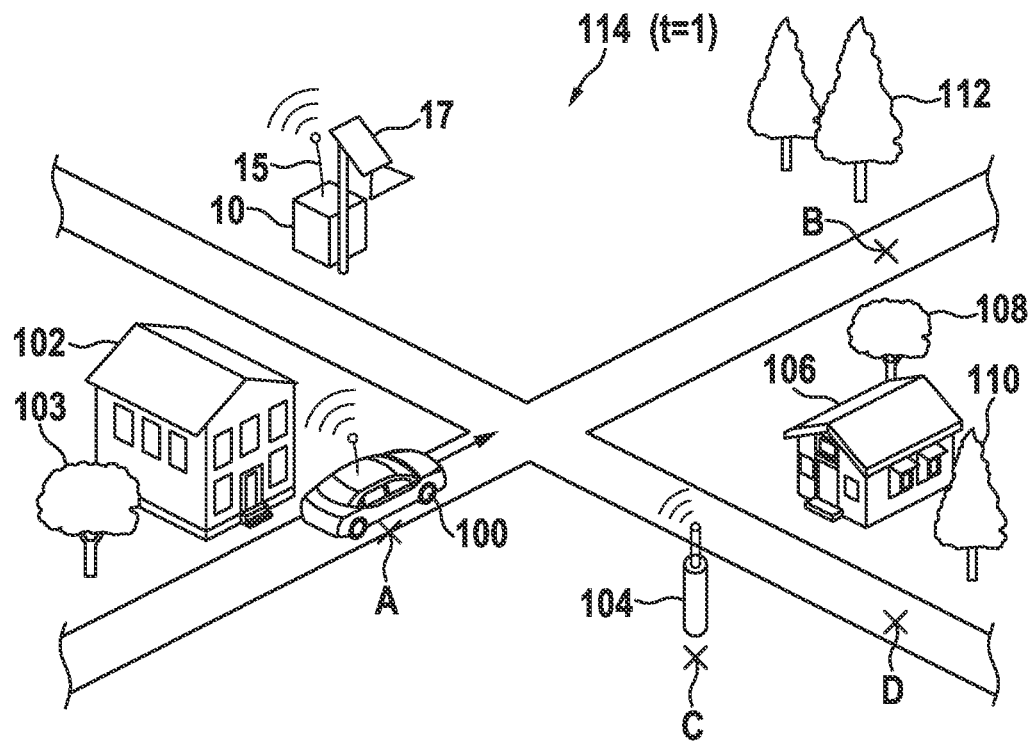
FIG. 3A schematically illustrates a wireless environment scenario at a first timestep, according to an example embodiment of the present invention.
FIG. 3B schematically illustrates an example of a radio figure of merit derived from the model characterising the wireless environment scenario of FIG. 3A.

FIG. 3A schematically illustrates a physical environment 114 scenario in a first state at a first timestep.

The state of the physical environment 114 at the first timestep includes a simple urban scenario comprising urban dwellings 102, 106, trees and vegetation 103, 112, 108, 110. In this scenario, the first radio node 100 at location A is travelling towards location B. Second radio node 104 at location C is a roadside unit RSU may, for example, be designed to transmit CAM messages to vehicles in the physical environment 114. A relay apparatus 10 according to the first aspect is coupled to a radio modem 15, thus enabling monitoring of radio communications from and between the first 100 and second 104 radio nodes. The relay apparatus 10 is further coupled to an environment sensor 17. The environment sensor 17 may, for example, be a video camera, depth camera, or a LIDAR.

In the scenario of FIG. 3A, factors affecting the radio channel figure of merit are variable. It is assumed that the antennas employed are omnidirectional, and effects on the radio channel figure of merit owing to variations in the effective antenna area between nodes are omitted. Between hypothetical radio nodes based at corresponding locations denoted by vectors AB, AC, and CD, line of sight performance is available, and thus a relatively good radio channel figure of merit (such as RSSI at the receive location), may be obtained, although dependent on the height of the nodes when at A and B, ground reflections may reduce (or increase) the overall RSSI. Between radio nodes based at corresponding locations denoted by vectors CB and BD, a line of sight path is not present. In the case of these paths, signal propagation may be dominated by diffraction around the relatively sharp edges of the dwelling 106 or the relatively soft outline of the tree 108. If a direct LOS path encounters a sharp obstruction (in the case of path CB, the side of dwelling 106) occluding the direct LOS path for more than $2/3$ of the first Fresnel zone radius away from the LOS path, signal loss due to diffraction can be significant, for example. Of course, more complicated fading relationships defining, for example, a Rayleigh multipath fading characteristic caused by reflections from the walls of dwellings 102 and 106 can be taken into account. In short, the radio figure of merit (such as RSSI) of radio nodes located at pairs of locations A, B, C, or D is a function that may be modelled.

FIG. 3B schematically illustrates an example of a radio figure of merit derived from the model characterising the wireless environment scenario of FIG. 3A.

The radio channel figure of merit used in the grid is notional, with a smaller number representing a lower attenuation between hypothetical node locations A, B, C, or D. The BD vector encounters relatively high attenuation, owing to the diffraction effect of the dwelling 106.

According to an embodiment, the model is configured to characterise a radio communication figure of merit between the first radio node 100 and the second radio node 104.

According to an embodiment, the processor 16 is configured to update the model characterising the state of the physical environment 114 by extracting significant features in the environment, and by performing offline or live ray-tracing using the model characterising the environment to characterise the radio communication figure of merit and a plurality of areas within the environment model.

For example, the apparatus 10 obtains a video or depth-map view of the state of the physical environment 114. Appropriately calibrated, this enables the apparatus 10 to construct a parametric or solid model of the physical state of the environment 114, taking into account the location of the dwellings 102, 106 and the trees 103, 112, 108, 110. The apparatus 10 may apply a ray tracing model to the model of the physical state of the environment 114, to thus enable a prediction of a radio communication figure of merit between hypothetical pairs of locations in the environment such as A, B, C, or D. In an example, the model may be a line of sight model. In an example, the model may be a non line of sight model. In an example, the model may combine line of sight and non-line of sight models.

For example, the apparatus 10 may obtain the location of the second radio node 114 from pre-configuration, calibration, or image recognition. The apparatus 10 may obtain the location of the first radio node 100 in the vehicle from a CAM message transmitted by the vehicle defining the velocity, appearance, and/or coordinate of the vehicle, along with image segmentation and recognition at the apparatus 10. The apparatus 10 may obtain the locations of the first 100 and second 104 radio nodes, and reference them to the radio figure of merit computed as a 3D spatial function of the physical state of the environment 114 using, for example, a ray tracing algorithm. This enables accurate and explicit computation of the condition that the relay attempt between the first radio node 100 and the second radio node 104 is permitted.

Figures 4A, 4B:
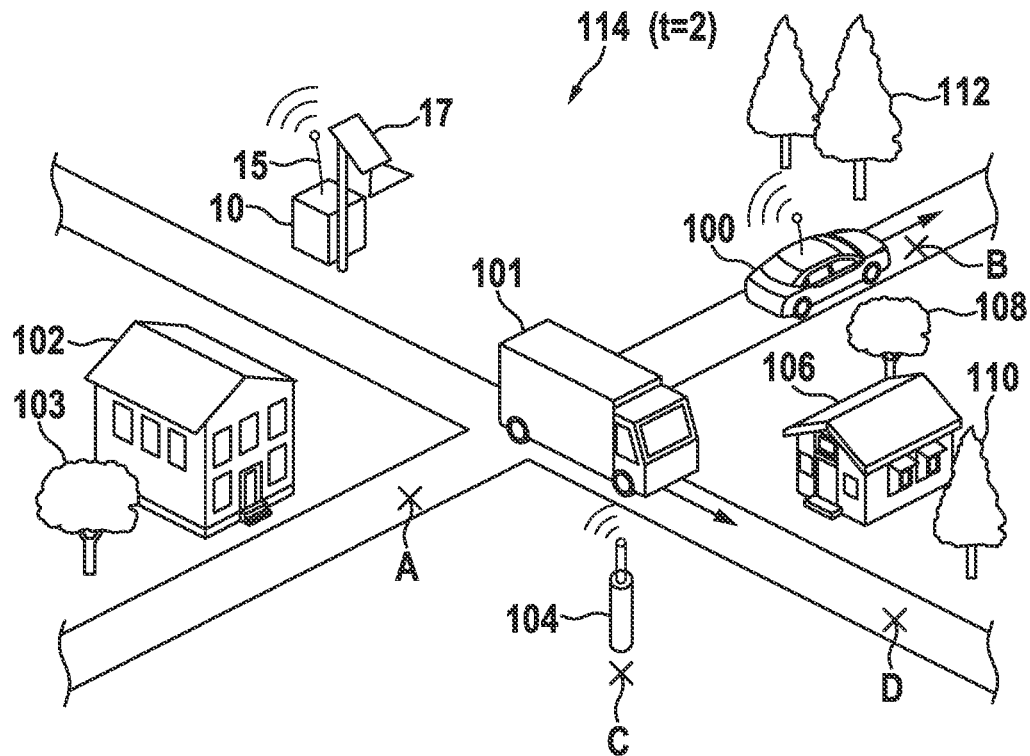
FIG. 4A schematically illustrates a wireless environment scenario at a second timestep, according to an example embodiment of the present invention.
FIG. 4B schematically illustrates an example of a radio figure of merit derived from the model characterising the wireless environment scenario of FIG. 4A.

FIG. 4A schematically illustrates a wireless environment scenario at a second timestep after the first timestep.

FIG. 4B schematically illustrates an example of a radio figure of merit derived from the model characterising the wireless environment scenario of FIG. 4A.

At the second timestep, the first radio node 100 has been carried (by its bearing vehicle) to location B of the physical state of the environment 114. A large truck acting as a line of sight obstacle 101 is crossing the intersection and causes a commensurate degradation in the radio channel figure of merit along vector CB, separating the first 100 and second 104 radio nodes. In this case, the relay apparatus 10 captures the change in the environment 117 using environmental sensor 17. The relay apparatus 10 recomputes or updates its model characterising the environment occupied by the first radio node and the second radio node to account for the change in the environment.

The relay apparatus 10 now senses, via its radio interface 12, an attempt by the second radio node 104 (RSU) to communicate to the first radio node 100 in the new position B of the first radio node 100. However, with reference to the updated multi-dimensional channel figure of merit obtained using the updated environment model, the relay apparatus 10 discerns that the radio figure of merit between B and C is 30. For example, the relay condition may, in this case, indicate that above a value of 25, a relay attempt between the first radio node 100 and the second radio node 104 is permitted. Accordingly, the relay 10 relays the attempt of the second radio node 104 (RSU) to communicate to the first radio node 100 in the new position B of the first radio node 100, and optionally subsequent radio communications between the first and second radio nodes, until the relay apparatus 10 recomputes or updates its model and finds that the radio figure of merit between B and C is below the (example) threshold of 25.

According to an embodiment, the area occupied by the first 100 and/or second 104 radio node is determined according to one or more CAM messages received by the processor 16 via the radio interface 12.

According to an embodiment, the relay condition derived based on the model of the environment is, at least partially, based on the output of a machine learning model applied to the model of the environment and/or data characterising the physical state of the environment.

For example, a machine learning model may be trained based on a corpus of 2D map data, 3D solid model data of an urban environment, and/or 2D video data of a physical state of the environment 114. The machine learning model may be trained to decide when relaying between at least the first and second radio nodes is permitted, based on the input of the environment information from the environment sensor 17, for example.

Figure 5:
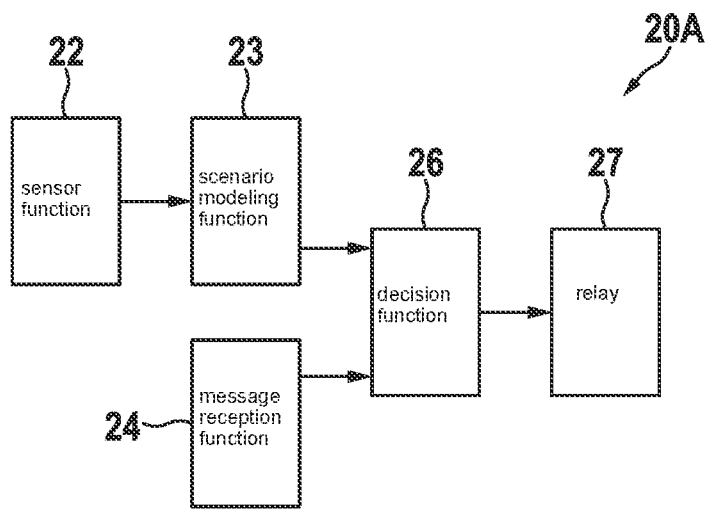
FIG. 5 schematically illustrates an example of a relaying technique, according to an example embodiment of the present invention.

FIG. 5 schematically illustrates an example of a relaying technique performed by the apparatus 10.

In the example 20A of FIG. 5, sensor function 22 reads one or more sensors via the monitoring interface 14 of the apparatus 10 configured to capture details of the physical state of the environment 114 and provides details of the environment to a scenario modelling function 23. The processor 16 performs the scenario modelling function 23 in which scenario models are created or updated, and wireless channel conditions between locations are calculated or predicted. The scenario models may be parametric models, live ray tracing models, or machine learning models, for example.

Furthermore, a message reception function 24 of the apparatus 10 receives and decodes a message to another radio node via the radio interface 12 indicating that a further node is, or is attempting, to transmit. The processor 16 performs a decision function 26 in which it decides whether, or not, to relay the message received by the radio interface 12. The decision to relay the message may be based on a change in scenario detected by the scenario modelling function 23, for example. The processor 16 performs a message relay function if the decision to relay the message is positive, and relays the message via the radio interface 12 of the apparatus.

Figure 6:
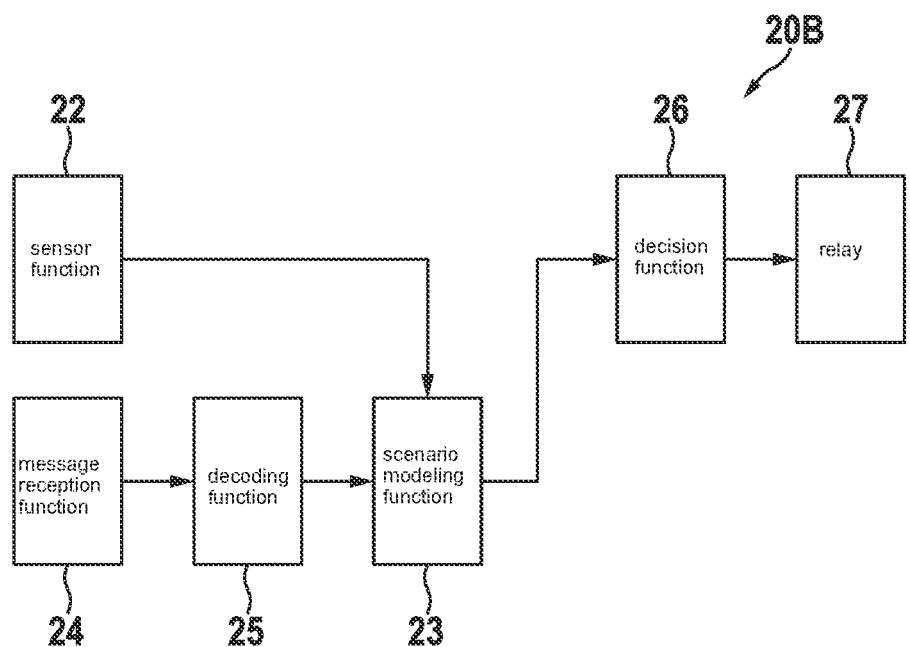
FIG. 6 schematically illustrates a further example of a relaying technique, according to an example embodiment of the present invention.

FIG. 6 schematically illustrates a further example of a relaying technique performed by the apparatus 10.

According to an embodiment, the radio interface 12 is configured to decode the attempt of the first radio node 100 to communicate with the second radio node 104, and to extract the position of the first radio node 100 from the decoded attempt and the relay condition is additionally based on the position of the first radio node 100 extracted from the decoded attempt.

In the example 20B of FIG. 6, a sensor function 22 reads one or more sensors via the monitoring device 14 of the apparatus 10 configured to capture details of the physical state of the environment 114 and provides details of the environment to a scenario modelling function 23. A message reception function 24 of the apparatus 10 receives and decodes a message to another radio node via the radio interface 12 indicating that a further node is, or is attempting, to transmit. The apparatus executes a position decoding function 25, configured to extract from the message to the another radio node, the position of the originating radio node that transmitted the decoded message. For example, the message may be in the CAM format and contain a coordinate of its transmitting node.

Based on the output of the scenario modelling function 23, the processor 16 performs a decision function 26 in which it decides whether, or not, to relay the message received by the radio interface 12. The decision to relay the message may be based on a change in scenario detected by the scenario modelling function 23, for example. The processor 16 performs a message relay function if the decision to relay the message is positive, and relays the message via the radio interface 12 of the apparatus.

Therefore, in the example 20B, the sensor processing function 22 predicts the channel conditions between the location of the transmitter of the received message which is decoded in the wireless modem and forwarded to the sensor processing unit and potential receiving radio nodes. The processing time is reduced to only the required calculation. Based on channel conditions between the transmitting radio node and areas where the message should be received, the decision function 26

Figure 7:
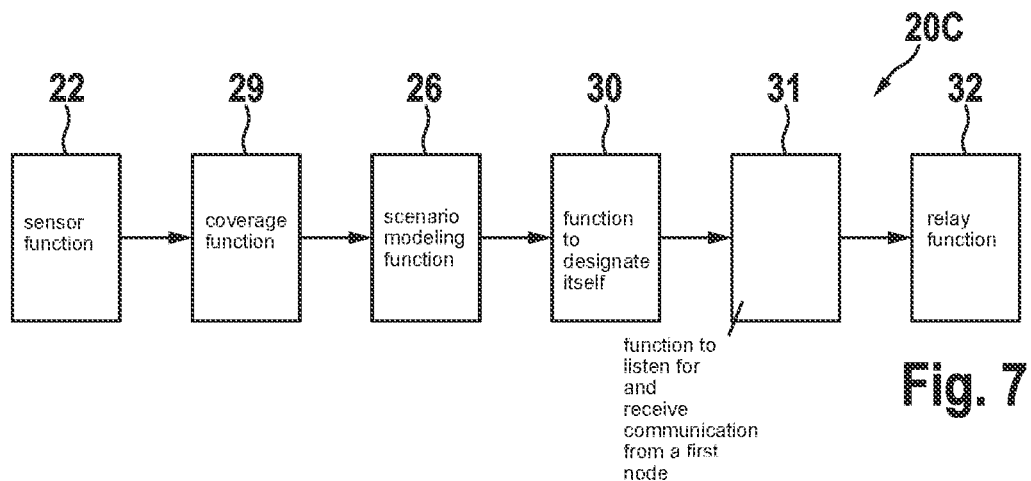
FIG. 7 schematically illustrates a further example of a relaying technique, according to the present invention.
Figure 8:
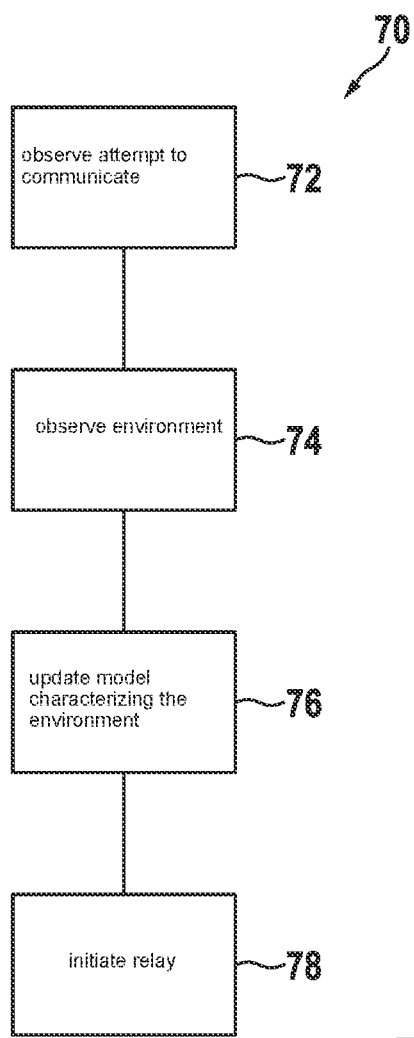
FIG. 8 schematically illustrates a method according to the second aspect, according to an example embodiment of the present invention.

FIG. 7 schematically illustrates a further example of a relaying technique performed by the apparatus 10.

According to an embodiment, the processor 16 is configured to detect a hidden node state between the second radio node 104 and the first radio node 100, and in response to the detection of the hidden node state, the processor 16 is configured to define that the relay attempt between the first radio node 100 and the second radio node 104 is permitted.

In variant 20C of FIG. 7, the first radio node (such as a roadside unit) has information defining the physical environment around the node and derives, using the model, an estimate of which areas of the physical environment 114 are not covered. The first radio node operating as the apparatus 10 may signal the intended message, and add a relay command either to a specific further radio node (such as a vehicle), or signal an area in which a specific further radio node should relay the message. In an embodiment, a transmit power indication may be signalled. The addressed vehicle or vehicles in the addressed area then relay the message such that the initial message can be received in a previously uncovered area.

The apparatus 10 performs a sensor function 22 that reads one or more environment sensors 17 via the monitoring device 14 of the apparatus 10 configured to capture details of the physical environment 114 and provides details of the environment to a scenario modelling function 23. Furthermore, a position of a first radio node such as a roadside unit is obtained, and a required portion of the physical environment 114 to cover from the first radio node is computed using a coverage function 29.

The processor 16 then performs a hidden node scenario modelling function 26 using input from the coverage function 29 in which scenario models are created or updated, and wireless channel conditions between locations are calculated or predicted. The scenario models may be parametric models, live ray tracing models, or machine learning models, for example. In this variant, the hidden node scenario modelling function 26 is configured to identify portions of the physical environment 114 which it is desired to cover, but which cannot be covered from the first radio node. In other words, the hidden node scenario modelling function 26 identifies portions of the physical environment 114 where, if a second node would be prospectively located, that the second node would be a hidden node relative to the first node.

The apparatus 10 is configured, upon determining that the second node would be a hidden node relative to the first node, to operate a function 30 to designate itself, or a further radio node, as a relay node. The apparatus 10 is configured to operate a function 31, which listens for, and receives a communication from the first node. The apparatus 10 is configured to operate a relay function 32 to relay the message from the first node to the second node, such that the second node is not a hidden node in the context of the specific environment detected by the environment sensor 17.

According to an embodiment, the processor 16 is configured to observe, via the radio interface 12, a further set of radio nodes, and, upon observing an attempt of the first radio node 100 to communicate with a radio node comprised in the further set of radio nodes, is configured to initiate the relaying, via the radio interface 12, of the attempt to a subset of radio nodes comprised in the further set of radio nodes, wherein the subset of radio nodes is determined based on a corresponding set of relay conditions derived based on the model characterising the environment indicates that a relay attempt between the first radio node 100 and the subset of radio nodes is permitted.

According to an embodiment, the processor is configured to obtain the predicted trajectory and/or velocity of a mobile radio node 100. The processor may optionally obtain the trajectory and/or velocity of the mobile radio node 100 via the environment sensor 17, or by decoding position information in the radio messages obtained via the radio interface 12. The trajectory may be predicted, for example, based on the speed of the mobile radio node 100 along a segment of road surface detected in the environment by an environment sensor such as a video or infra-red camera. The processor 16 is configured to compute, for one or more future time points, a radio figure of merit experienced between a first radio node and the mobile radio node. The processor 16 is configured to generate a relay retransmission schedule defining time ranges when the relay apparatus 10 should retransmit received messages from the first radio node to the mobile radio node, or vice versa.

A skilled person will appreciate that the many and varied implementation architectures afford many implementations of the above concept with no loss of generality. For example, the apparatus 10 may be provided as an integrated unit with one or more environment sensors 17 and a radio modem 15 integrated into a unified enclosure that could be mounted on a lamp post or building, for example. Alternatively, the apparatus 10 may be provided as a remote server, cloud service, or edge device that is communicably coupled to at least one radio modem 15 and environment sensor 17 located within the physical environment 114. The apparatus may obtain, for the model, additional data from internet data feeds such as weather report services, traffic support services, mapping services, and the like. The apparatus may obtain data characterising the physical state of the environment from further environment sensors belonging to third parties, such as local authority security camera systems, for example.

According to a second aspect, there is provided a computer implemented method 70 for generating a relay transmission to a second node based on observing a transmission attempt from a first radio node 100 in an environment. The method comprises:

observing 72, via a radio interface 12, an attempt by the first radio node 100 to communicate with the second radio node 104;

observing 74 the environment 114, via a monitoring interface 14 configured to receive data characterising the physical state of the environment 114;

updating 76, using a processor 16, a model characterising the environment comprising the first radio node 100 and the second radio node 104; and initiating 78, via the radio interface 12, a relay of the attempt by the first radio node 100 to communicate with the second radio node 104, wherein the attempt is relayed to the second radio node 104 if a figure of merit derived based on the model indicates that a relay attempt between the first radio node 100 and the second radio node 104 is permitted.

According to an embodiment, the method 70 further comprises:

detecting at least one obstacle in-between an area of the first radio node 100 and an area of the second radio node 104 in the model characterising the environment, and declaring the relay condition that the relay attempt between the first radio node 100 and the second radio node 104 is permitted if the at least obstacle is determined by the processor 16 to degrade the radio communication figure of merit of a radio channel between the first radio node 100 and the second radio node 104 by a significant amount.

According to a third aspect, there is provided a system for assisted radio message relaying. The system comprises an apparatus 10 according to the first aspect, a radio 15 communicatively coupled with the radio interface 12 of the apparatus, and configured to receive and/or transmit to the first and second radio nodes 104, an environment sensor 17 configured to obtain monitoring data of an environment 114, and at least first 100 and second 104 radio nodes comprised within an environment observed by the environment sensor. The environment sensor is configured to observe the environment comprising at least the first radio node 100 and the second radio node, and to transmit data characterising the physical state of the environment and/or the locations of the at least first and second radio nodes to the processor 16.

According to an embodiment, the environment sensor is selected from the group of at least one of a video camera, an infra-red camera, a 3D depth camera, a stereoscopic camera, or a LIDAR.

According to a fourth aspect, there is provided a computer program product comprising instructions which, when the program is executed by a processor 16, cause the processor to carry out the method of the second aspect.

According to a fifth aspect, there is provided a computer readable medium comprising instructions which, when executed by a processor, cause the processor 16 to carry out the method of the second aspect.

The examples provided in the drawings and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications, and further applications to these within the scope of the specification are desired to be protected.

What is claimed is:

1. An apparatus configured to generate a relay transmission in an environment to a second radio node for a transmission attempt from a first radio node, the first and second radio nodes being located in the environment, the apparatus being external to the first radio node and to the second radio node and comprising:

a radio interface configured to receive radio channel data of the environment and to generate data including radio transmissions for transmission into the environment;

a monitoring interface;

at least one environment sensor configured to observe, without use of detections of signals of communications between the first and second radio nodes, a current physical state of the environment in which the first and second radio nodes are located; and a processor communicatively coupled to the radio interface and the monitoring interface, the processor configured to:

update or generate a model characterizing the environment occupied by the first radio node and the second radio node based, at least partially, on data that represents the current physical state observed by the at least one environment sensor and that is received from the at least one environment sensor via the monitoring interface;

observe, via the radio interface, an indication of an attempt of the first radio node to communicate with the second radio node;

use the model to predict presence, at a future point in time of a condition that will be suboptimal for signal transmission between the first and second radio nodes; and based on the prediction and without observing a presently extant condition for suboptimality of signal transmissions between the first radio node and the second radio node, respond to the observed indication of the attempt by initiating the relaying, via the radio interface, of the attempt of the first radio node to communicate with the second radio node.

2. The apparatus according to claim 1, wherein the model characterizes a radio communication figure of merit, between the first radio node and the second radio node.

3. The apparatus according to claim 2, wherein the condition prediction includes an occupation by at least one obstacle in-between an area occupied by the first radio node and an area occupied by of the second radio node in the environment that would degrade the radio communication figure of merit of a radio channel between the first radio node and the second radio node by a significant amount.

4. The apparatus according to claim 2, wherein the processor is configured to update the model characterizing the environment by extracting significant features in the environment, and by performing offline or live ray-tracing using the model characterizing the environment to characterize the radio communication figure of merit and a plurality of areas within the environment model.

5. The apparatus according to claim 1, wherein an area occupied by the first and/or second radio node is determined according to one or more CAM messages received by the processor via the radio interface.

6. The apparatus according to claim 1, wherein the prediction is, at least partially, based on output of a machine learning model applied to the model of the environment.

7. The apparatus according to claim 1, wherein the processor is configured to: observe, via the radio interface, a further set of radio nodes, and, upon observing an attempt of the first radio node to communicate with a radio node of the further set of radio nodes, initiate the relaying, via the radio interface, of the attempt to a subset of radio nodes in the further set of radio nodes, wherein the subset of radio nodes is determined based on a corresponding set of relay conditions that are derived based on the model characterizing the environment and that indicate that a relay attempt between the first radio node and the subset of radio nodes is permitted.

8. The apparatus according to claim 1, wherein the radio interface is configured to decode the attempt of the first radio node to communicate with the second radio node, and to extract a position of the first radio node from the decoded attempt; and wherein the prediction is additionally based on the position of the first radio node extracted from the decoded attempt.

9. The apparatus according to claim 1, further comprising:
a radio modem communicatively coupled to the radio interface, and configured to receive data from and/or transmit data to the first and second radio nodes via the radio channel.

10. The apparatus according to claim 1, wherein the prediction includes predicting presence of a hidden node between the second radio node and the first radio node.

11. The apparatus according to claim 1, wherein the at least one environment sensor is at least one of a video camera, an infrared camera, a 3D depth camera, a stereoscopic camera, and a LIDAR.

12. A computer implemented method for generating a relay transmission in an environment to a second node for a transmission attempt from a first radio node, the first and second radio nodes being located in the environment, the method being performed by an apparatus that is external to the first radio node and to the second radio node and the method comprising:

observing, via a radio interface, an attempt by the first radio node to communicate with the second radio node;
obtaining, from at least one environment sensor that is configured to observe, without use of detections of signals of communications between the first and second radio nodes, a current physical state of the environment in which the first and second radio nodes are located and via a monitoring interface, data that represents the current physical state observed by the at least one environment sensor; and
using a processor:
updating or generating a model characterizing the environment including the first radio node and the second radio node based on the data that represents the current physical state observed by the at least one environment sensor;
using the model to predict presence, at a future point in time of a condition that will be suboptimal for signal transmission between the first and second radio nodes; and
based on the prediction and without observing a presently extant condition for suboptimality of signal transmissions between the first radio node and the second radio node, respond to the observed indication of the attempt by initiating, via the radio interface, a relay of the attempt by the first radio node to communicate with the second radio node.

13. The method according to claim 12, wherein the prediction includes predicting presence of at least one obstacle in-between an area of the first radio node and an area of the second radio node.

14. A system for assisted radio message relaying, comprising:
a first radio node;
a second radio node;
at least one environment sensor configured to observe, without use of detections of signals of communications between the first and second radio nodes, a current physical state of an environment in which the first and second radio nodes are located;
an apparatus configured to generate a relay transmission in the environment to a second radio node for a transmission attempt from a first radio node, the first and second radio nodes being located in the environment, the apparatus being external to the first radio node and to the second radio node and including:
a radio interface configured to receive radio channel data of the environment and to generate data including radio transmissions for transmission into the environment,
a monitoring interface, and
a processor communicatively coupled to the radio interface and the monitoring interface, the processor configured to:
update or generate a model characterizing the environment occupied by the first radio node and the second radio node based, at least partially, on data that represents the current physical state observed by the at least one environment sensor and that is received from the at least one environment sensor via the monitoring interface;
observe, via the radio interface, an indication of an attempt of the first radio node to communicate with the second radio node; and use the model to predict presence, at a future point in time of a condition that will be suboptimal for signal transmission between the first and second radio nodes; and based on the prediction and without observing a presently extant condition for suboptimality of signal transmissions between the first radio node and the second radio node, respond to the observed indication of the attempt by initiating the relaying, via the radio interface, of the attempt of the first radio node to communicate with the second radio node;

a radio modem communicatively coupled with the radio interface of the apparatus, and configured to receive from and/or transmit to the first and second radio nodes; and a data communications network configured to communicatively couple the apparatus, the radio modem, and the environment sensor.

15. A non-transitory computer readable medium on which is stored a computer program for generating a relay transmission in an environment to a second node for a transmission attempt from a first radio node, the first and second radio nodes being located in the environment, the computer program being executable by a computer of an apparatus that is external to the first radio node and to the second radio node and, when executed by the computer, causing the computer to perform the following steps:

observing, via a radio interface, an attempt by the first radio node to communicate with the second radio node;

obtaining, from at least one environment sensor that is configured to observe, without use of detections of signals of communications between the first and second radio nodes, a current physical state of the environment in which the first and second radio nodes are located and via a monitoring interface, data that represents the current physical state observed by the at least one environment sensor; and using a processor:

updating or generating a model characterizing the environment including the first radio node and the second radio node based on the data that represents the current physical state observed by the at least one environment sensor;

using the model to predict presence, at a future point in time of a condition that will be suboptimal for signal transmission between the first and second radio nodes; and based on the prediction and without observing a presently extant condition for suboptimality of signal transmissions between the first radio node and the second radio node, respond to the observed indication of the attempt by initiating, via the radio interface, a relay of the attempt by the first radio node to communicate with the second radio node.

* * * * *